United States Patent
Dülgar et al.

(10) Patent No.: US 12,080,169 B2
(45) Date of Patent: Sep. 3, 2024

(54) METHOD FOR THE AUTOMATIC MERGING OF A VEHICLE

(71) Applicant: DAIMLER AG, Stuttgart (DE)

(72) Inventors: Yildirim Dülgar, Sindelfingen (DE); Hubert Rehborn, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 320 days.

(21) Appl. No.: 17/632,069

(22) PCT Filed: Jul. 27, 2020

(86) PCT No.: PCT/EP2020/071136
§ 371 (c)(1),
(2) Date: Feb. 1, 2022

(87) PCT Pub. No.: WO2021/023549
PCT Pub. Date: Feb. 11, 2021

(65) Prior Publication Data
US 2022/0254256 A1    Aug. 11, 2022

(30) Foreign Application Priority Data
Aug. 2, 2019   (DE) .............. 10 2019 005 446.6

(51) Int. Cl.
*G08G 1/16*    (2006.01)
*G06V 20/17*   (2022.01)
(Continued)

(52) U.S. Cl.
CPC ............. *G08G 1/167* (2013.01); *G06V 20/17* (2022.01); *G06V 20/54* (2022.01); *G08G 1/012* (2013.01);
(Continued)

(58) Field of Classification Search
CPC ...... G08G 1/167; G08G 1/012; G08G 1/0129; G08G 1/0145; G08G 1/096725; G08G 1/164; G06V 20/17; G06V 20/54
See application file for complete search history.

(56) References Cited

U.S. PATENT DOCUMENTS

| | | |
|---|---|---|
| 11,117,584 B2 | 9/2021 | D'sa et al. |
| 2005/0015203 A1 | 1/2005 | Nishira |

(Continued)

FOREIGN PATENT DOCUMENTS

| | | |
|---|---|---|
| CN | 109272748 A | 1/2019 |
| DE | 102004034445 A1 | 4/2005 |

(Continued)

OTHER PUBLICATIONS

English Machine Translation of DE-102018009651-A1 (Year: 2018).*

(Continued)

*Primary Examiner* — Andrew J Cromer
(74) *Attorney, Agent, or Firm* — PATENT PORTFOLIO BUILDERS PLLC

(57) ABSTRACT

A method for the automatic merging of a vehicle from a slip road into a lane of traffic involves determining a primary merging position in advance at which the vehicle is to undertake a lane change from the slip road to the lane of traffic. If the lane change at the primary merging position or as close as possible to it does not lead to road users in the lane of traffic being obstructed, the vehicle is controlled in such a way that the lane change is carried out at the primary merging position. Otherwise, the lane change is carried out at a secondary merging position which is determined depending on detected clearances between road users in the lane of traffic.

8 Claims, 1 Drawing Sheet

(51) Int. Cl.
  *G06V 20/54* (2022.01)
  *G08G 1/01* (2006.01)
  *G08G 1/0967* (2006.01)

(52) U.S. Cl.
  CPC ......... *G08G 1/0129* (2013.01); *G08G 1/0145* (2013.01); *G08G 1/096725* (2013.01); *G08G 1/164* (2013.01)

(56) References Cited

U.S. PATENT DOCUMENTS

2017/0076607 A1* 3/2017 Linder .................. G08G 1/166
2019/0139415 A1* 5/2019 Sakaguchi ............ B60W 30/10

FOREIGN PATENT DOCUMENTS

| DE | 102018007293 A1 | | 2/2019 |
| DE | 102018009651 A1 | * | 7/2019 |
| DE | 102018009651 A1 | | 7/2019 |
| DE | 102019205228 A1 | | 10/2019 |

OTHER PUBLICATIONS

International Search Report mailed Nov. 13, 2020 in related/corresponding International Application No. PCT/EP2020/071136.
Office Action created Jul. 2, 2020 in related/corresponding DE Application No. 10 2019 005 446.6.
Written Opinion mailed Nov. 13, 2020 in related/corresponding International Application No. PCT/EP2020/071136.
Office Action dated Mar. 8, 2023 in related/corresponding CN Application No. 202080053850.1.

* cited by examiner

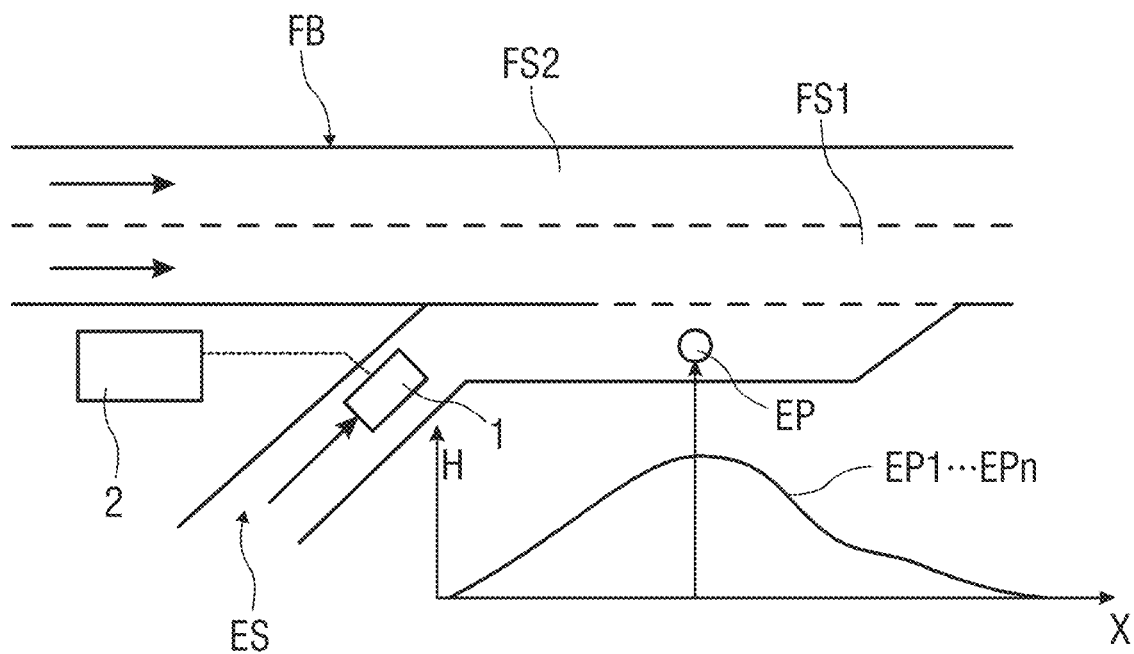

METHOD FOR THE AUTOMATIC MERGING OF A VEHICLE

BACKGROUND AND SUMMARY OF THE INVENTION

Exemplary embodiments of the invention relate to a method for the automatic merging of a vehicle from a slip road into a lane of traffic.

A method for operating a vehicle driving in autonomous driving operation is known from DE 10 2018 007 293 A1. Here, in each case a minimum time gap, which is smaller than a predetermined target time gap, and, in each case a relaxation time is predetermined for a process for the vehicle to return to a lane of traffic or for a process for it to change lanes. A returning process and a lane-change process are carried out if the minimum time gap is not fallen below and a prediction emerges that a distance apart from a vehicle driving in front of the vehicle is increased to the target time gap within the relaxation time predetermined for the returning process or for the lane change process. Furthermore, a method for driving assistance for a lane change from a current lane to an adjacent traffic lane by a motor vehicle is known from DE 10 2018 007 293 A1, in particular for merging into an adjacent traffic lane. Here, a front space and a rear space of an adjacent target lane are monitored for the desired lane change, distance from vehicles detected there and their speeds are measured, and safety distances are calculated from this. If all distances measured are greater than the calculated safety distances, this is recognized as a possible lane change.

Exemplary embodiments of the invention are directed to an improved method in comparison to the prior art for the automatic merging of a vehicle from a slip road into a lane of traffic.

According to the invention, in the method for the automatic merging of a vehicle from a slip road into a lane of traffic, i.e., for automatically carrying out a lane change from the slip road into the lane of traffic, a primary merging position is predetermined, i.e., determined in advance, at which the vehicle is to carry out the lane change if the lane of traffic to change into is clear. The lane change is carried out at the primary merging position when it does not lead to any obstruction to road users in the lane of traffic. Otherwise, i.e., if the lane change would lead to an obstruction to road users in the lane of traffic, the lane change is carried out at a secondary merging position that is determined depending on detected clearances between road users in the lane of traffic. Road users can be assumed to be obstructed if they have to swerve to avoid a collision or have to delay their journey more than just slightly, i.e., have to delay it with a delay that exceeds a predetermined value.

The method enables a comfortable merging process of an automatically, in particular highly automatically or autonomously, driving vehicle from a slip road into a lane of traffic, for example at an exit onto an A road, a dual carriageway, or a motorway. Furthermore, the method makes it possible to map human behavior when controlling vehicles for automatic vehicles and to define the merging process at any exit in free traffic for an automatically driving vehicle as human driver would typically do.

In a possible design of the method, the primary merging position is determined based on data from observing traffic. In doing so, the merging process can be carried out reliably, wherein merging positions are used that are typically used in road traffic.

In a further possible design of the method, merging positions, observed when observing traffic, of other road users are determined as data from the traffic observation, and the primary merging position is determined based on a frequency analysis of the observed merging positions of the other road users. This enables merging positions typically used in road traffic on the respective slip road to be determined particularly reliably and the primary merging positions to be adjusted to the merging position typically used on the respective slip road by the road users.

In a further possible design of the method, the traffic observation is carried out by means of at least one camera, which records the slip road and the lane of traffic at least sectionally from an aerial perspective. Here, the camera can be arranged stationarily in the region of the slip road and/or the lane of traffic. Alternatively, or additionally, the traffic observation is carried out by means of at least one camera, which is arranged on an unmanned flying object, also referred to as a drone. Recording the slip road and the lane of traffic from an aerial perspective causes a comprehensive traffic observation and a reliable recording of merging positions of the vehicles using the slip road.

In a further possible design of the method, the traffic observation is carried out by means of surroundings data recorded by means of other road users when using the slip road and/or data specific to road users. In doing so, a comprehensive traffic observation and a reliable recording of merging positions of the vehicles using the slip road can also be carried out.

In a further possible design of the method, the surroundings data and/or data specific to road users is transmitted to a central computing unit external to the vehicle, which determines the primary merging position from this. On one hand, this minimizes a required memory capacity and computing capacity in the vehicle and, on the other hand, the transmitted data can be provided for other road users or can be used for a plurality of road users.

In a further possible design of the method, the data specific to road users comprises a respective merging position of the corresponding road user, such that the primary merging position can be determined in a simple manner.

In a further possible design of the method, only merging positions of manually controlled vehicles are used to determine the primary merging position on the basis of merging positions of the road users. Thus, with increasingly better data acquisition, e.g., upon determining the typical merging positions of vehicles, the process of autonomous vehicles returning to lane can be designed more comfortably and better by it being adapted to typical merging processes of normal drivers. This can also take place when, in free traffic, time gaps between vehicles driving in the lane of traffic and possibilities for merging are varied. Differentiating between manually controlled and automatically controlled vehicles is possible, for example, by evaluating light signals which automatically driving vehicles emit, in order to inform other traffic participants about the automatic operation.

In a further possible design of the method, the primary merging position is predetermined as a flexible position region. This means a more flexible region for merging is recommended to the automatically driving vehicle, for example a stretch in which at least 70% of all real drivers have merged, or for example no merging recommendation in route sections at the start and end of a slip road in which under 15% of all drivers have merged. With increasing emergence of traffic, the flexible region can also be used as a target range for a comfortable merging process.

In a further possible design of the method, when determining the primary merging position, feedback relating to comfort when merging given by vehicle occupants in the vehicle is taken into consideration. Thus, when ascertaining the primary merging position, a recommendation of vehicle occupants in automatic merging processes already carried out can be used in order to optimize a choice of the merging positions.

Exemplary embodiments of the invention are explained in more detail below by means of a drawing.

BRIEF DESCRIPTION OF THE DRAWING FIGURE

The sole drawing schematically illustrates a top view of a driving track and a frequency distribution of merging processes at different positions of the driving track.

DETAILED DESCRIPTION

In the sole FIGURE, a top view of a driving track FB and a frequency distribution of merging positions EP1 to EPn of different merging processes are depicted. Here, the frequency distribution shows a respective frequency H of different merging processes at different positions X of the driving track FB.

The driving track FB is a component of a multi-lane road and comprises two lanes of traffic FS1, FS2 in the same driving direction and a slip road ES, also referred to as an acceleration lane or acceleration strip. A vehicle 1 wanting to merge into the lane of traffic FS1 is on the slip road ES.

In an automatic, in particular highly automatic or autonomous operation of the vehicle 1, it is important that the vehicle 1 changes from the slip road ES to the lane of traffic FS1 at the correct merging position EP. During a merging process, there must not be any danger to either the vehicle 1 and its occupants or other road users. Furthermore, the merging process should take place in such a way that, during it, as great a degree of comfort as possible is achieved for occupants of the vehicle 1.

In order to obtain these goals, the vehicle 1 is formed for an automatic driving operation in which it can carry out a reliable merging and/or overtaking process at a fixed local position. Furthermore, the vehicle 1 is formed to connect to a central computing unit 2 external to the vehicle, for example a so-called backend server, in terms of data technology.

In order to ensure that the merging or returning to lane of automatically driving vehicles 1 is made more comfortable and is modelled on a typical merging of normal drivers, it is provided that the autonomous vehicle 1 uses a median of merging positions EP1 to EPn of non-automatically driving vehicles, which merged into the lane of traffic FS1 from the slip road ES temporally in advance in the respective infrastructure, as the primary merging position EP at which the lane change is preferably to be carried out at a respective exit on the slip road ES. This primary merging position EP corresponds to a typical merging process of average properties of real drivers. Here, the automatically driving vehicle 1 seeks to change lanes at the primary merging position EP and adheres to this if no other road users, in particular further vehicles not depicted in more detail, in the driving surroundings influence the merging process. As an alternative to forming the median, the primary merging position EP can also be predetermined as a mean of the merging positions EP1 to EPn.

In other words: a position at which the vehicle 1 is to change from the slip road ES into the lane of traffic FS1 is specified as the primary merging position EP for the automatically driving vehicle 1. During the automatic driving operation of the vehicle 1, this primary merging position EP is used as the target position for the lane change when an obstruction to road users in the lane of traffic FS1 is avoided when changing lanes. This is the case when a road user in front of whom the vehicle 1 is merging when changing lanes does not have to react to the vehicle 1, or only has to do so with a minimal delay.

A median of the merging positions EP1 to EPn of an exit is determined by means of aerial observations that provide images corresponding to the depiction shown in FIG. 1. That is to say, the primary merging position EP is determined based on data from traffic observation by, in a frequency analysis of observed merging positions EP1 to EPn of other road users, their median being determined and being used as the predetermined merging position EP.

For example, to do so a traffic observation is carried out by means of at least one camera which records the slip road ES and at least the adjacent lane of traffic FS1 at least in sections from an aerial perspective. The camera can here be arranged stationarily in the region of the slip road ES and/or the lane of traffic FS1. Alternatively, or additionally, the traffic observation is carried out by means of at least one camera arranged on an unmanned flying object, also referred to as a drone.

Alternatively, or additionally, it is furthermore possible that the traffic observation is carried out by means of surroundings data recorded by means of other road users when using the slip road ES and/or one of the lanes of traffic FS1, FS2 and/or data specific to road users. The surroundings data and/or data specific to road users is transmitted to the central computing unit 2 external to the vehicle by means of a so-called V2X-communication (V2X=vehicle-to-everything), from which the computing unit ascertains the primary merging position EP. In doing so, the data specific to road users comprises a respective merging position EP1 to EPn of the corresponding road user. That is to say, it is possible to determine the medians of the merging positions EP1 to EPn at any exit by real measurements from fleet data and/or drone observations and/or observations carried out by means of cameras.

Different infrastructure-dependent merging positions EP of random exits are thus stored on a cloud-based backend and are transmitted to various vehicles 1. It is also possible that the different infrastructure-dependent merging positions EP1 to EPn are present on a digital map in the automatically operating vehicle 1.

In order to achieve that the primary merging position EP is modelled on the typical merging of normal drivers, only merging positions EP1 to EPn of manually controlled vehicles (not depicted in more detail) are used for determining the primary merging position EP by means of the merging positions EP1 to EPn of the road users in a possible design. Differentiating between manually controlled and automatically controlled vehicles is here carried out by evaluating light signals that automatically driving vehicles emit to inform other road users about the automatic operation.

In a further possible design, the primary merging position EP is determined as a flexible position region with several individual positions. That is to say, a more flexible region for merging is recommended to the automatically driving vehicle 1, for example a route section in which at least 70% of all real drivers have merged. Here, route sections for merging at the start and/or end of the slip road ES, for example, in which under 15% of all drivers merged can be discarded. This greater flexible region of the merging recommendation can also be used as a target range of a comfortable merging process with increasing traffic occurrence.

In order to optimize a determination and choice of the primary merging positions EP, it is provided in a possible design that acknowledgement given by vehicle occupants in the automatically driving vehicle 1 and relating to comfort when merging is taken into consideration, i.e., a piece of feedback is taken into consideration.

If there are no more precise measurements of the merging positions EP1 to EPn for a certain slip road ES, an initial merging position EP, for example in a center of a respective exit, i.e., slip road ES, can be assumed.

It is also possible that the primary merging position EP determined for the automatically driving vehicle 1 is outside the slip road ES. This can occur, for example, when there is too low a foundation of data, for example when the merging position EP is only determined by means of data of a single road user who has merged in late a few meters after the end of the slip road ES. If this is the case, the automatically driving vehicle 1 ignores this inadmissible merging position EP.

As described, the primary merging position EP is used during the automatic driving operation of the vehicle 1 when an obstruction to road users in the lane of traffic FS1 is avoided. In contrast, if there is a risk of obstruction to road users in the lane of traffic FS1 when using the primary merging position EP, a secondary merging position (not depicted in more detail) is determined depending on detected clearances between road users one behind the other in the lane of traffic FS1 and, during the automatic driving operation of the vehicle 1, it is used as the target position for the lane change. That is to say, if the use of the primary merging position EP is not possible in the due to a traffic occurrence in the driving surroundings, a sufficient time gap is determined in order to carry out the merging process.

This determination is carried out, for example, in such a way that the automatically driving vehicle 1 attempts to merge where there is a relatively high possibility of the vehicle 1 finding a corresponding time gap, i.e., a corresponding time interval, between road users one behind the other in the lane of traffic FS1. Such a time gap is dependent, in particular, on a traffic state on the route section with the slip road ES. Time gap distributions can be measured depending on the traffic state using, for example, a sensor system on the part of the infrastructure at exits, i.e., in particular at slip roads ES, wherein the time gap intervals are transmitted to the central computing unit 2 and can thus be retrieved by the automatically driving vehicle 1. A further possible embodiment provides that the time gap distribution dependent on the traffic state can be determined by a vehicle fleet itself or by means of recorded signals of a detection possibility on the part of the vehicle.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for an automatic merging of a vehicle from a slip road into a lane of traffic, the method comprising: predetermining a primary merging position at which the vehicle is to undertake a lane change from the slip road to the lane of traffic when the lane of traffic is clear; controlling the vehicle in such a way that the lane change is performed in proximity to the primary merging position when the lane change does not lead to road users in the lane of traffic being obstructed by the vehicle; and controlling the vehicle in such a way that the lane change is performed in proximity to a secondary merging position when the lane change in proximity to the primary merging position would lead to an obstruction to the road users in the lane of traffic, wherein the secondary merging position is determined depending on detected clearances between the road users in the lane of traffic, wherein the primary merging position is predetermined based on data of a traffic observation, and wherein the data of the traffic observation includes observed merging positions of other road users, and the primary merging position is predetermined based on a frequency analysis of the observed merging positions of the other road users.

2. The method of the method claim 1, wherein the traffic observation is performed by at least one camera, which records at least sections of the slip road and the lane of traffic from an aerial perspective.

3. The method of claim 1, wherein the traffic observation is performed using surroundings data recorded by other road users when driving on the slip road or the lane of traffic or using data specific to the other road users.

4. The method of claim 3, wherein the surroundings data or the data specific to the other road users is transmitted to a central computing unit external to the vehicle, wherein the central computing unit predetermines the primary merging position from the surroundings data or the data specific to the other road users.

5. The method of claim 3, wherein the data specific to the other road users comprises a respective merging position of a corresponding one of the other road users.

6. The method of claim 1, wherein the primary merging position is predetermined as a position region.

7. The method of claim 1, wherein when predetermining the primary merging position, feedback provided by vehicle occupants in the vehicle and relating to comfort when merging is considered.

8. A method for an automatic merging of a vehicle from a slip road into a lane of traffic, the method comprising: predetermining a primary merging position at which the vehicle is to undertake a lane change from the slip road to the lane of traffic when the lane of traffic is clear; controlling the vehicle in such a way that the lane change is performed in proximity to the primary merging position when the lane change does not lead to road users in the lane of traffic being obstructed by the vehicle; and controlling the vehicle in such a way that the lane change is performed in proximity to a secondary merging position when the lane change in proximity to the primary merging position would lead to an obstruction to the road users in the lane of traffic, wherein the secondary merging position is determined depending on detected clearances between the road users in the lane of traffic, wherein the primary merging position is predetermined based on data of a traffic observation, wherein the data of the traffic observation includes observed merging positions of other road users, and the primary merging position is predetermined based on a frequency analysis of the observed merging positions of the other road users, and wherein only observed merging positions of manually controlled vehicles are used to predetermine the primary merging position using the observed merging positions of the other road users.

* * * * *